June 18, 1968

A. HÄFLIGER 3,389,204

METHOD OF FORMING PELLETS AND APPARATUS THEREFOR

Filed Nov. 18, 1964

INVENTOR
ALBERT HÄFLIGER

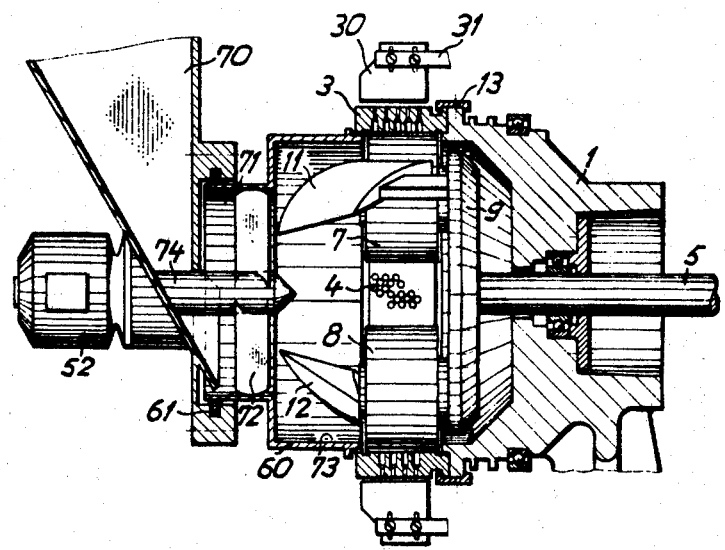

United States Patent Office 3,389,204
Patented June 18, 1968

3,389,204
METHOD OF FORMING PELLETS AND
APPARATUS THEREFOR
Albert Häfliger, Saint Gall, Switzerland, assignor to
Gebruder Buhler, Uzwil, Switzerland
Filed Nov. 18, 1964, Ser. No. 412,065
Claims priority, application Switzerland, Dec. 17, 1963,
15,437/63
10 Claims. (Cl. 264—142)

ABSTRACT OF THE DISCLOSURE

An extrusion press for pasty to granular materials is disclosed as including feeding means comprising a rotatable feeding drum or ring including a cylindrical portion whose inner diameter is essentially equal to the inner diameter of the press mold, but preferably slightly less than the inner diameter of the press mold. The material to be extruded is fed, under the influence of centrifugal force, to this inner surface. Scraping members are revolvable with the press rollers and move along the inner surface of the cylindrical portion of the feed drum to scrape the material which is in a uniformly thick layer thereon into the press mold.

Background of the invention

This invention relates to the production of limited length extrusions from materials ranging from pasty to granular, such as so-called fodder cubes. More particularly, the present invention is directed to a novel method of and apparatus for producing such extruded components with improved uniformity of feeding of the raw material to the extrusion press which is preferably a horizontal axis press.

Presses for the production of extruded components of limited lengths, from materials ranging from pasty to granular, and having pressing elements revolving about a horizontal axis, are known. The known arrangements comprise a stationary support for a stationary press mold, and at least one pressing element supported in the mold, for revolution, about a horizontal axis, with respect to the inner surface of the press mold. The press mold is perforated around its cylindrical surface so that the revolution of the pressing element extrudes material, fed into the mold, through the perforations to the outer surface of the mold. These presses include charging means, such as a charging blade, operatively associated with the revolving pressing element and rotating with it. Devices are provided to feed the raw material to the charging blades and thus to the interior of the press mold body. The material extruded through the apertures of the mold is severed by severing devices which revolve substantially in contact with the external cylindrical surface of the mold, and having a timed relation with the pressing element such as to sever extrusions of a preselected length.

Various types of feeding devices have been used with such presses. A known type is a feed hopper secured on the press, generally on the press mold, and on the side of the latter remote from its support. Feeding devices of this type do not provide a uniform feed of raw material between the press mold and the pressing elements. This results in the production of extruded products, such as fodder cubes, which are of unequal lengths and are non-uniformly pressed. Another type of feeding device for presses of this nature is a worm mounted on the press support for synchronous revolution with respect to the revolving pressing elements. Arrangements of this latter type have the disadvantage that they are difficult to seal properly, and, furthermore, the uniformity of the feed of raw material between the press mold and the revolving pressing elements is unsatisfactory from a practical standpoint.

Accordingly, an object of the present invention is to provide a novel method of feeding raw material to an extrusion press and which provides a uniform feed of raw material between a cylindrical press mold and a pressing element or pressing elements revolving in operative association with the inner surface of the mold.

Another object of the invention is to provide novel feeding means for an extrusion press having pressing elements revolving about a horizontal axis in operative association with the inner surface of a cylindrical mold, and which feeding device assures a uniform feed of the raw material between the pressing elements and the inner cylindrical surface of the mold.

A further object of the invention is to provide a novel method of feeding raw material to an extrusion press of the type having a cylindrical press mold and pressing elements revolving about a horizontal axis in operative association with the inner cylindrical surface of the press mold, in which the raw material is uniformly spread over the inner surface of an annular member having a diameter substantially equal to that of the press mold, while the raw material is advanced axially into the press mold.

Still another object of the invention is to provide a feeding device for a horizontal axis extrusion press, of the type including a cylindrical mold and pressing element revolving about the axis of the mold in operative association with the inner cylindrical surface of the mold, and which includes an annular element adjacent the press mold and having a diameter substantially equal to that of the press mold, and means for spreading the raw material in a substantially uniform layer over the inner surface of this annular member while moving the material axially toward the press mold.

A still further object of the invention is to provide a feeding device of the type just mentioned in which the annular surface is constituted either as a feed drum or as a feed ring.

Still a further object of the invention is to provide a feeding device of the type mentioned above in which the inner surface of the annnular member is swept by the charging means of the extrusion press.

For an understanding of the principles of the invention, reference is made to the following description of typical embodiments thereof, as illustrated in the accompanying drawings:

In the drawings:

FIG. 3 is a view, similar to FIG. 1, illustrating a further modification of the feeding device embodying the invention.

Figure 1:
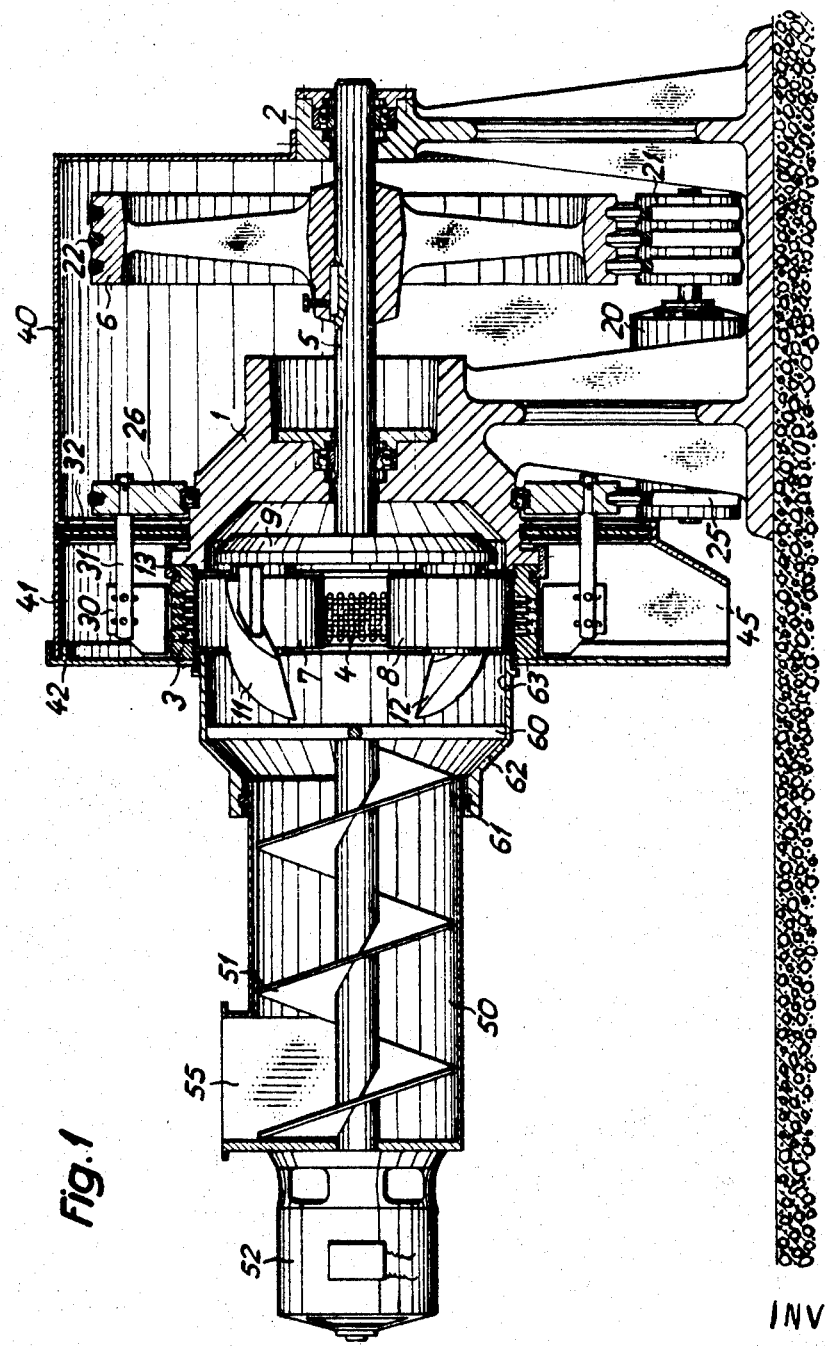
FIG. 1 is an axial sectional view through an extrusion press incorporating a feeding device embodying the present invention.

Referring first to FIG. 1, the extrusion press is illustrated as mounted upon a suitable support, such as a stationary stand 1, having an auxiliary support 2 operatively associated therewith and preferably integral therewith. Stand 1 supports a cylindrical press mold 3 which is formed with press bores or apertures 4 which may have either a circular or a polygonal configuration or cross section, these bores or perforations 4 extending through the cylindrical wall of mold 3 and being preferably uniformly distributed both axially and circumferentially thereof. Mold 3 is secured to stand 1 by suitable means such as a clamping ring 13. The main portion of stand 1, together with the auxiliary support 2, rotatably mounts a shaft 5. The outer end of shaft 5 is supported in auxiliary support 2 and the inner end of shaft 5 projects substantially coaxially toward the mold 3. Between its support in the main portion of stand 1 and its support in auxiliary support 2, shaft 5 has secured to rotate therewith a relatively large diameter press driving pulley 6, which is preferably formed with grooves in its external circumferential surface. A circular mounting disk 9 is rigidly secured to the inner end of shaft 5, and rotatably supports one or more pressing elements such as pressing rolls 7 and 8. Disk 9 further supports the charging blades 11 and 12 for charging material between the press rolls 7 and 8 and the inner cylindrical surface of press mold 3.

A motor 20 drives a relatively small diameter pulley 21 which preferably has grooves in its external circumferential surface. V-belts 22 are trained around pulleys 6 and 21 to drivingly connect pulley 21 to rotate pulley 6 and thus to rotate shaft 5 and the parts carried thereby.

Motor 20 has another driving pulley on the opposite end of its shaft and, through the medium of a V-belt 25, this latter pulley drives a grooved driving disk 26 which is annular and is mounted on anti-friction bearings on the stand 1. Through the medium of pins 31, disk 26 supports stripping knives 30 which are operatively associated with the external surface of mold 3 to strip extrusion from this surface. A dust ring 32 is secured to rotate with disk 26, as illustrated, and separates the press mold and its associated parts from the driving system to the right of the main portion of stand 1.

A cylindrical hood 40, having a closed outer wall preferably secured to the auxiliary support 2, encloses the mold mechanism and the driving mechanism. Together with the disk 32 and an annular end plate 42 secured to the mold 3 and having a groove receiving the outer end of hood 40, the latter defines a collecting duct 41 which has an extruded material outlet or discharge 45.

Driving disk 26 carrying the stripping knives 30 may be operated either in synchronism with the pressing elements or rollers 7 and 8, and the charging plates 11 and 12, or may be operated at a speed which is adjustable relative to the speed of operation of the press rollers and the charging blades. The disk 26 is furthermore angularly adjustable to preset its lag with respect to the press rollers.

Figure 2:
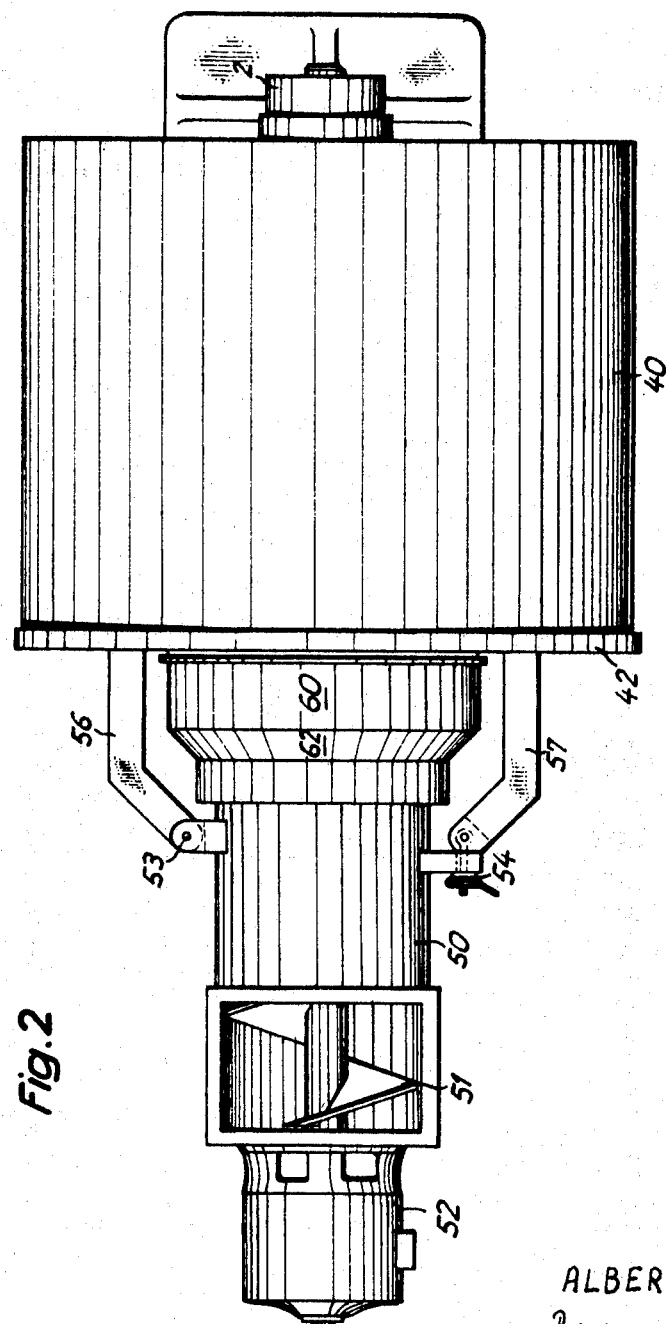
FIG. 2 is a top plan view of the apparatus shown in FIG. 1.

In accordance with the invention, a novel feeding device is provided for feeding material uniformly between the pressing rolls or rollers 7 and 8 and the inner cylindrical surface of stationary press mold 3. As illustrated in FIGS. 1 and 2, a cylindrical housing extends substantially coaxially with the shaft 5 and the mold 3, in the position shown in FIGS. 1 and 2, and a feed worm 51 extends through the housing 50 and is rotated by a motor 52. As particularly illustrated in FIG. 2, housing 50 may be pivoted about a fulcrum 53 toward and away from the press and can be secured, in coaxial relation with the press, by a releasable clamping means 54. Adjacent motor 52, the cylindrical housing 50 is provided with a feed opening or inlet 55. The housing 50 is supported on the press, for the mentioned swinging movement, by arms 56 and 57 which extend from and are either secured to or integral with the closure plate 42 for the hood 40.

Between the feed worm 51 and the press mold 3, there is positioned an annular member 60 which may be either a feed drum or a feed ring. This member 60 is secured to rotate with the worm 51 and relative to the tubular housing 50 and, for this purpose, a sealing disk 61 is provided between the member 60 and the housing 50. In its portion extending inwardly from the inner end of housing 50, the member 60 includes a frusto-conical transition portion 62 which leads to a cylindrical portion 63 having a diameter substantially corresponding to the inner diameter of mold 3.

The embodiment of the invention just described operates in the following manner: The materials to be extruded may range from pasty or doughy to granular, and are preferably such as used for forming fodder cubes. However, the materials may include dust, plastic waste, etc., which, because they can be pelletized, are much easier to process, transport and store. These materials are fed through inlet 55 to feed worm 51 which rotates at a relatively high speed. Feed worm 51 moves the materials axially through stationary housing 50 toward the press. In the present case, this press includes the press rolls 7 and 8 which revolve independently of the rotation of feed worm 51.

At the press end of housing 50, the materials enter the feed device 60 which revolves with the feed worm 51. In feed member 60, the materials to be extruded first flow, due to centrifugal force, over the frusto-conical surface 62 and into the cylindrical zone 63. The materials form a film on the inner surface of member 63, and this film is stripped off by charging blades 11 and 12 and fed between the pressing rolls 7 and 8 and the inner cylindrical surface of press mold 3.

It should be emphasized that worm or screw 51, and particularly feed member 60, are rotated at such a high speed that a thin film of the material is formed on the inner surface of the feed drum by centrifugal force. Due to this centrifugal force, this film of pasty to granular materials is substantially evenly distributed so that it is stripped off very uniformly by the charging blades 11 and 12, thus insuring a uniform feed of the material between the press rolls 7 and 8 and mold 3. Correspondingly, the uniform feed of the materials to be extruded to the press rolls 7 and 8 assures a uniform extrusion of these materials through the bores 4 of press mold 3. This results in a uniform growth of the extruded materials, so that extruded articles of uniform length are stripped from mold 3 by the stripping knives 30.

FIG. 3 illustrates another embodiment of feeding device in accordance with the invention. In FIG. 3, the press itself, its support, the mold member 3, the pressing rollers, and other associated parts are identical with the arrangements shown in FIGS. 1 and 2. The difference is in the feeding means. The feeding device of FIG. 3 includes the rotatable annular feed member 60, as in FIGS. 1 and 2, with which is associated an upwardly extending feed hopper 70. Hopper 70 and feed ring 60 are mounted for swinging toward and away from the press in the same manner as are the housing 50 and feed member 60 of FIGS. 1 and 2.

In contrast to the arrangement shown in FIG. 1, the exit of feed hopper 70 is immediately adjacent a cylindrical part 71 of feed member 60. This cylindrical part 71 is connected, by propeller-shaped wings or arms 72, with drive shaft 74 of feed motor 52. A sealing gasket 61 seals portion 71 from feed hopper 70. The inner end of part 71, which is nearer to the press, merges with a diametrically extending wall which, in turn, merges with a cylindrical part 73 which has essentially the same diameter as the inner surface of the press mold 3 engaged by the pressure rolls 7 and 8.

The feed drum or feed ring 60 of FIG. 3 rotates at such a high angular velocity that the materials to be extruded, as fed from feed hopper 70, are first spread in a somewhat uniform layer on the cylindrical part 71. They are then moved axially by the blades 72 to the cylindrical part 73 which has a substantially larger diameter. The material is spread as a much more uniform layer on the inner surface of part 73, due to the centrifugal force. The uniformly distributed material on the inner surface of part 73 is stripped therefrom by charging blades 11 and 12 and fed to the pressure rollers 7 and 8.

The arrangement of FIG. 3 has the advantage that the overall length of the feeding device, from the feed hopper 70 to the pressing rolls 7 and 8, is substantially less than that of the feeding device of FIGS. 1 and 2. However, this is not necessarily advantageous for all materials. In both embodiments, however, the main object is to produce a certain generally relatively high speed difference between the speed of the feeding device on the one hand and the speed of the pressing rolls on the other hand, and also to spread the materials to be extruded as a uniform layer in the feed ring 60 before they are fed to the pressing rolls. The speed differential between the feeding device including the feed drum or feed ring 60 and the pressure rolls 7, 8 can be obtained either by rotating the drum or feed ring 60 at a higher speed relative to shaft 5 and pressing rolls 7 and 8, or by an opposite direction of rotation of the pressing rollers relative to the feed ring 60. By virute of the independent drive of the feeding device, including the feed drum or feed ring 60, by means of motor 52, and relative to the pressing rolls 7 and 8 driven by motor 20 through pulley 21 and driving wheel 6, it is easy to select optimum speed differentials for various materials to be pressed.

While specific embodiments of the invention have been shown and described in detail to illustrate the application of the principles of the invention, it will be understood that the invention may be embodied otherwise without departing from such principles.

What is claimed is:

1. In the production of limited length extrusions of materials ranging from pasty materials to granular materials by feeding the material to an extrusion press of the type including a stationary cylindrical press mold, having apertures in its cylindrical wall, and pressing means revolving about a substantially horizontal axis, within the mold, to press the material through the apertures in the mold, the improved method of feeding material to the press comprising the steps of: spreading the material, by centrifugal force, in a substantially uniform layer over an inner cylindrical surface of a diameter substantially equal to the internal diameter of the press mold and coaxially in advance of the press mold; and feeding such substantially uniform layer of material to the pressing means.

2. In the production of limited length extrusions from material ranging from pasty to granular by feeding the material to an extrusion press including a support, a substantially cylindrical press mold stationarily mounted on said support and having apertures in its cylindrical wall, at least one pressing element supported within said mold for revolution about a substantially horizontal axis relative to the inner surface of said mold, charging elements operatively associated with said pressing element and revolving with the latter to feed material to the pressing element, and severing means revolvable relative to the external cylindrical surface of said mold: improved material feeding means for the press comprising, in combination, an annular feed device mounted for rotation relative to said pressing element and having an inner surface adjoining the inner surface of said mold; and means for feeding materials to be extruded to said annular feeding device for spreading, by centrifugal force, as a substantially uniform layer on such inner surface of said device for feeding to said pressing element.

3. In the production of limited length extrusions from material ranging from pasty to granular by feeding the material to an extruded press including a support, a substantially cylindrical press mold stationarily mounted on said support and having apertures in its cylindrical wall, at least one pressing element supported within said mold for revolution about a substantially horizontal axis relative to the inner surface of said mold, charging elements operatively associated with said pressing element and revolving with the latter to feed material to the pressing element, and severing means revolvable relative to the external cylindrical surface of said mold: improved material feeding means for the press comprising, in combination, an annular feed device mounted for rotation relative to said pressing element and having an inner surface adjoining the inner surface of said mold; and means for feeding materials to be extruded to said annular feeding device for spreading, by centrifugal force, as a substantially uniform layer on such inner surface of said device for feeding to said pressing elements; said annular feed device surrounding the charging elements for stripping of the material on the inner surface of said device to feed such material to the pressing element.

4. In the production of limited length extrusions from material ranging from pasty to granular by feeding the material to an extrusion press including a support, a substantially cylindrical press mold stationarily mounted on said support and having apertures in its cylindrical wall, at least one pressing element supported within said mold for revolution about a substantially horizontal axis relative to the inner surface of said mold, charging elements operatively associated with said pressing element and revolving with the latter to feed material to the pressing element, and severing means revolvable relative to the external cylindrical surface of said mold: improved material feeding means for the press comprising, in combination, an annular feed device mounted for substantially coaxial rotation relative to said pressing element and having an inner surface adjoining the inner surface of said mold; means for feeding materials to be extruded to said annular feeding device for spreading, by centrifugal force, as a substantially uniform layer on such inner surface of said device for feeding to said pressing element; and means mounting said annular feed device for displacement relative to the press mold.

5. In the production of limited length extrusions from material ranging from pasty to granular by feeding the material to an extrusion press including a support, a substantially cylindrical press mold stationarily mounted on said support and having apertures in its cylindrical wall, at least one pressing element supported within said mold for revolution about a substantially horizontal axis relative to the inner surface of said mold, charging elements operatively associated with said pressing element and revolving with the later to feed material to the pressing element, and severing means revolvable relative to the external cylindrical surface of said mold: improved material feeding means for the pressing comprising, in combination, an annular feed device mounted for substantially coaxial rotation relative to said pressing element and having an inner surface of said device, in the zone adjoining the inner surface of said mold, having a diameter substantially equal to the internal diameter of the mold; said annular feed device including a frusto-conical portion converging outwardly from such zone; and means for feeding material to be extruded to said frusto-conical portion of said annular feed device for spreading, by centrifugal force, as a substantially uniform layer, on such inner surface of said device in said zone.

6. In the production of limited length extrusions from material ranging from pasty to granular by feeding the material to an extrusion press including a support, a substantially cylindrical press mold stationarily mounted on said support and having apertures in its cylindrical wall, at least one pressing element supported within said mold for revolution about a substantially horizontal axis relative to the inner surface of said mold, charging elements operatively associated with said pressing element and revolving with the latter to feed material to the pressing element, and severing means revolvable relative to the external cylindrical surface of said mold: improved material feeding means for the press comprising, in combination, an annular feed device mounted for substantially coaxial rotation relative to said pressing element; said annular feed device including first and second cylindrical stepped surfaces, the diameter of said second surface being substantially greater than that of said first surface, and said second surface being in a zone adjoining the inner surface of said mold and having a diameter substantially equal to the internal diameter of said mold; and means for feeding material to be extruded to said first surface for spreading, by centrifugal force, as a substantially uniform layer on said second surface in said zone.

7. In the production of limited length extrusions from material ranging from pasty to granular by feeding the material to an extrusion press including a support, a substantially cylindrical press mold stationarily mounted on said support and having apertures in its cylindrical wall, at least one pressing element supported within said mold for revolution about a substantially horizontal axis relative to the inner surface of said mold, charging elements operatively associated with said pressing element and revolving with the latter to feed material to the pressing element, severing means revolvable relative to the external cylindrical surface of said mold, and driving means for revolving said pressing element, said charging elements and said severing means: improved means for feeding material to the press comprising, in combination, an annular feed device mounted for substantially coaxial rotation relative to said pressing element, the inner surface of said device, in the zone adjoining the inner surface of said mold, having a diameter substantially equal to the internal diameter of said mold; driving means, independent of the press driving means, for rotating said annular feed device independently; and means for feeding material to be extruded for spreading, by centrifugal force, as a substantially uniform layer on such inner surface of said device in said zone.

8. In the production of limited length extrusions from material ranging from pasty to granular by feeding the material to an extrusion press including a support, a substantially cylindrical press mold stationarily mounted on said support and having apertures in its cylindrical wall, at least one pressing element supported within said mold for revolution about a substantially horizontal axis relative to the inner surface of said mold, charging elements operatively associated with said pressing element and revolving with the latter to feed material to the pressing element, and severing means revolvable relative to the external cylindrical surface of said mold: improved material feeding means for the press comprising, in combination, an annular feed device mounted for substantially coaxial rotation relative to said pressing element, the inner surface of said device, in the zone adjoining the inner surface of said mold, having a diameter substantially equal to the internal diameter of said mold; a relatively elongated stationary cylindrical housing extending coaxially outwardly from said annular feed device and supporting the latter for rotation; a feed worm rotatably mounted in said housing and connected to said annular feed device for rotation with the latter; and means for driving said worm and said annular feed device to feed material to be extruded to said annular feed device for spreading, by centrifugal force, as a substantially uniform layer on such inner surface of said device in said zone.

9. In the production of limited length extrusions from material ranging from pasty to granular by feeding the material to an extrusion press including a support, a substantially cylindrical press mold stationarily mounted on said support and having apertures in its cylindrical wall, at least one pressing element supported within said mold for revolution about a substantially horizontal axis relative to the inner surface of said mold, charging elements operatively associated with said pressing element and revolving with the latter to feed material to the pressing element, and severing means revolvable relative to the external cylindrical surface of said mold: improved material feeding means for the press comprising, in combination, an annular feed device mounted for substantially coaxial rotation relative to said pressing element, the inner surface of said device, in the zone adjoining the inner surface of said mold, having a diameter substantially equal to the internal diameter of said mold; and a stationary hopper having a discharge extending at least partially into said annular feed device to feed material to be extruded to said annular feed device for spreading, by centrifugal force, as a substantially uniform layer on such inner surface on said device in said zone.

10. In the production of limited length extrusions from material ranging from pasty to granular: the improvement claimed in claim 2 further comprising means for adjusting the speed of said severing means relative to the speed of said pressing element to select the length of the extrusions.

References Cited

UNITED STATES PATENTS

| | | | |
|---|---|---|---|
| 2,272,007 | 2/1942 | James | 107—8.35 |
| 2,279,632 | 4/1942 | Meakin | 107—8.35 |
| 2,295,743 | 9/1942 | Meakin | 18—12 |
| 2,798,444 | 7/1957 | Meakin | 18—12 X |
| 2,370,952 | 3/1945 | Gordon | 18—12 X |
| 2,845,036 | 7/1958 | Fisher | 107—14 |
| 2,908,038 | 10/1959 | Meakin | 18—12 |
| 3,143,766 | 8/1964 | Rohn | 18—12 |
| 3,167,813 | 2/1965 | Keefe | 18—12 |

FOREIGN PATENTS

| | | |
|---|---|---|
| 1,278,103 | 10/1961 | France. |
| 281,048 | 12/1964 | Netherlands. |

WILLIAM J. STEPHENSON, *Primary Examiner.*

ROBERT F. WHITE, *Examiner.*

S. I. LANDSMAN, *Assistant Examiner.*